UNITED STATES PATENT OFFICE.

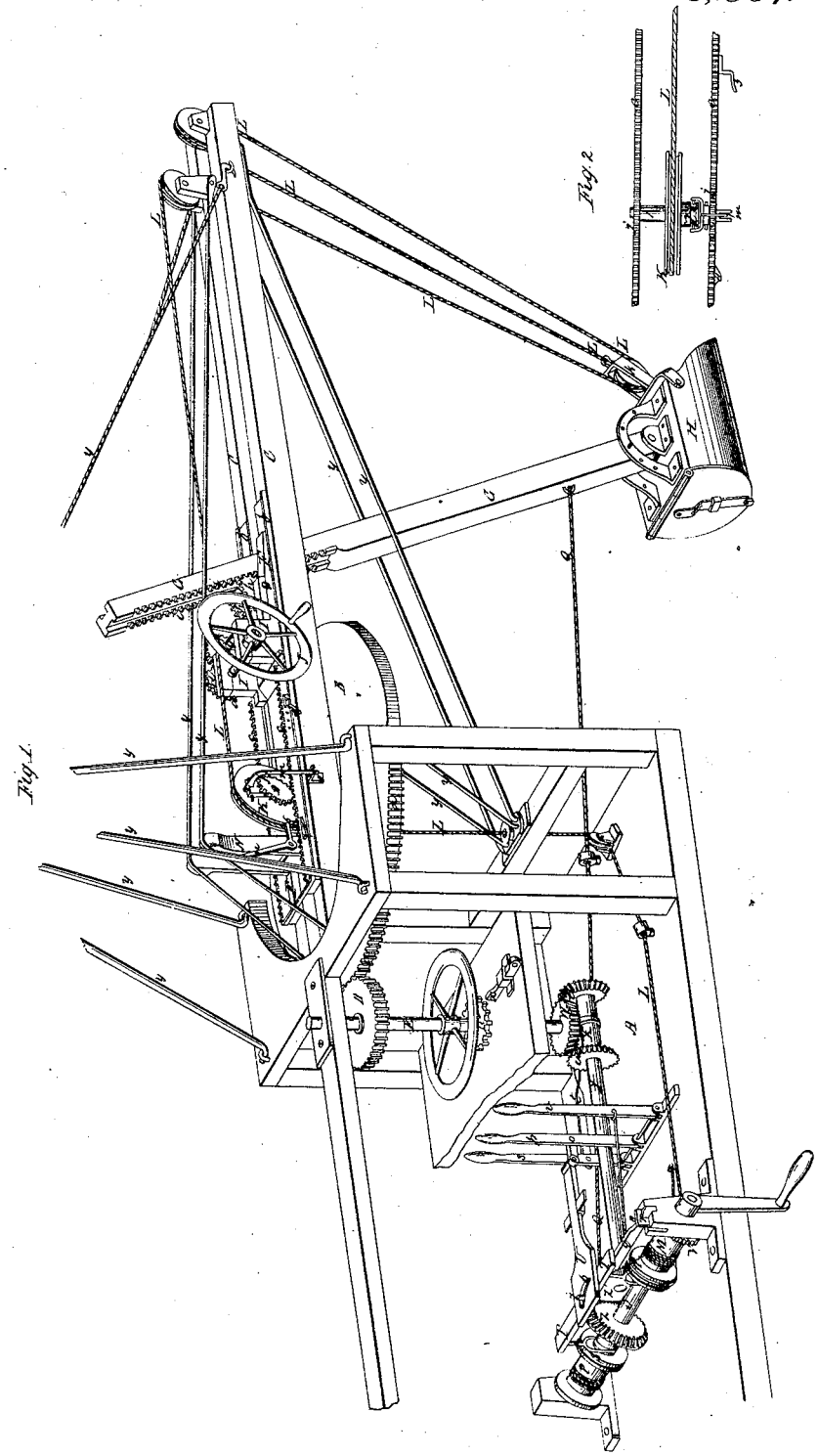

JONATHAN R. ANDERSON, OF CHICAGO, ILLINOIS.

EXCAVATING AND DREDGING MACHINE.

Specification of Letters Patent No. 16,519, dated February 3, 1857.

*To all whom it may concern:*

Be it known that I, JONATHAN R. ANDERSON, of Chicago, in the county of Cook and State of Illinois, have invented certain new and useful Improvements in Excavating and Dredging Machines; and I do hereby declare the following to be a full, clear, and exact description of the same, reference being had to the accompanying drawings, making a part thereof, in which—

Figure 1, represents a perspective view of the machine, and Fig. 2, a detached top view of the clutch on a large scale, to show its arrangement.

The nature of my invention, relates more especially to the carriage to which the dipper is hung, so that said dipper may sweep over a greater space when it is filling, and thus insure its filling, when from the hard nature of the earth it would not otherwise do so. And also to the mechanical device for operating or controlling the action of the dipper.

To enable others skilled in the art to make and use my invention, I will proceed to describe the same with reference to the drawings.

A, represents a frame or scow upon which the machinery is supported.

B, is a turn table pivoted on an elevated frame, so that it may freely turn thereon to the extent of about 180 degrees. Upon this turn table B, is permanently secured the arms C, C, upon which the machinery, to be hereafter described, which operates the dipper, is placed. The rear portion of the rim of the turntable B, is provided with cogged gear $a$, into which, a pinion D, on an upright shaft E, takes and turns said table, and the dipper connected to it, into any of the positions within its scope, either for filling or for emptying the dipper.

On suitable ways $b, b$, on the arms C, C, is placed a traveling carriage F, the sides of which are furnished with racks $c, c$. The shank or handle G, of the dipper H, passes through between the two arms C, C, and is secured to the front end of the carriage, by a pin and slot, or by a buckle and friction rolls, so that the dipper may be raised and lowered, while the shank or handle continues to be secured to said carriage. A shaft $e$, is hung in pillow blocks I, I, which are connected to the traveling carriage F, upon one end of which shaft is a hand wheel J, and upon its opposite end a gear wheel $d$, which meshes with a pinion $f$, placed upon a shaft $g$, also supported in the carriage F. This shaft $g$, carries two other pinions $h, h$, near its center, which take into the straight racks $i$ $i$ on the rear side of the dipper handle or shank G, so that by turning the hand wheel J, the dipper may be raised or lowered when desired. Near the rear of the carriage, in proper supports, is arranged a shaft 1, carrying two pinions $j$, (one only being seen in Fig. 1, but both in Fig. 2,) which also gear with the straight racks $c, c$, on the carriage. On the center of this shaft 1, is placed a sheave K, over which passes a chain L, which extends from the drum M, through, over, and around, suitable eyes, rollers, and guides, to the bail $k$, of the dipper H, where it is secured, as shown in the drawing, Fig. 1. This sheave K, runs loose upon the shaft 1, until the clutch $l$, is thrown into gear with it, as seen in Fig. 2, and then it runs in one direction with the shaft, but in the opposite direction its clutch teeth, slips past those of the clutch $l$, and it runs independent of the shaft again.

In Fig. 1, $m$, is the clutch lever, which is pivoted at 2, and its lower end extends downward, so as to be pressed in toward the carriage, by a trigger 3, attached to the carriage, which moves the clutch and connects the shaft and sheave. The trigger 3, may be adjusted back or forward on the carriage, so as to operate the clutch, at such period as will suffice to give the proper traverse to the dipper, this movement or its extent carying with the degree of hardness, that the material to be excavated may possess. Or it may be removed so as not to throw the clutch into gear at all, when the earth to be excavated, is very soft, and the dipper would fill by simply moving in the arc of a circle, of which, the distance from the dipper to where its shank is connected to the carriage would be the radius. But in excavating hard-pan, it is found that a simple sweep of the dipper will not fill it, and that it is necessary to move the dipper along in contact with the hard material to insure its being filled; and to accomplish this end and purpose, is the leading object of my improvement. This traverse of the dipper in a plane parallel to the arms $c, c,$ can be regulated to suit the different kinds of material found in excavating, and may vary from one to several feet in extent. Or, as before stated, if the earth be very soft, it need not traverse at all, but merely move in the arc of its circle.

A cam plane 4, is arranged on the rear of the carriage, which as the carriage moves forward on the arms C C, throws the clutch lever $m$, and clutch $l$ out, and releases the sheave K, so that it may freely run on its shaft. The distance therefore between the cam plane 4, and trigger 3, regulates the transverse of the carriage, and the transverse of the carriage governs the transverse of the dipper.

$n$ is a lever, pivoted to a standard N, upon which there is a dog 5; when the carriage is intended to traverse this dog is raised up as shown in Fig. 1, but when the carriage is to remain stationary this dog 5, is thrown into rack $c$, and holds the carriage. By this arrangement the dipper has not only the same range and extent of operation, without moving the frame or scow, to which it is connected, that other excavators have, but it possesses this peculiar advantage over all others that it can cut or excavate in curved or concentric lines, as well as in right lines by having an automatic movement back and forth on the arms C, C.

O, is a shaft to which the power to drive the machine, may be communicated, and which power may be continuous, notwithstanding the various movements of the dipper. On this shaft O, is arranged the drum M which takes the chain L, heretofore described; and on its opposite end another drum P, which winds up the chain Q, that draws down the dipper. There are two clutches R, S, on this shaft, which are connected to a clutch bar T, and this bar T, is moved by the lever $p$, through the intervention of the cam shaft 6 in the sliding piece U, and the pin 7, in the clutch bar T. Now the drums M, P, are loose on the shaft O, and only turn with said shaft when their clutch R, or S, may be thrown into gear with them, and the length and extent of motion of the clutch bar T, is such, that in throwing one clutch into gear, it at the same time throws the other one out of gear. But the bar may be so moved as to throw both clutches out of gear, and then the shaft may continue to run, without driving the machinery connected with it. Near the end of the shaft, and on the drum M, there is a ratchet wheel V;—and connected with the clutch bar T, there is another bar $q$, which has a depression 8 cut in its end, which end passes through a droppawl or dog $r$. When the pawl or dog $r$ is suspended by the depression 8, it is in gear with the ratchet V, and holds the drum M from running on the shaft, but when the pawl or dog, is suspended on the bar $q$, on either side of the depression then it is raised up from the ratchet, and does not touch it. When the lever $p$ is in a perpendicular position, the clutches are both thrown out of gear with the drums, and the pawl is in gear with the ratchet. When the lever $p$, is moved to the left the clutch R, is out of gear with its drum, and the clutch S, in gear with its drum—and when moved to the right the clutch S, is out, and the one R in gear with their drums respectively.

$s$, is a lever, which is connected by a rod $t$, to the two bevel gears $i$ $i$, so that either gear may be brought into mesh with the bevel gear W, on the lower end of the shaft E—or both kept out of gear with W, as may be required, the object being to rotate the shaft E, in either direction so as in turn it may move the turn table B, arms C, and dipper H. The bevel gears $u$, are connected with sleeve X, that moves on the shaft Y, by a groove and feather, in the well known way, so as to turn with said shaft, which receives its motion from the shaft O, through the bevel gearing Z, Z'.

The lever $v$, is a simple break lever, for stopping the drum M, at any time, should occasion require its stoppage.

On the shaft E, there is a stop wheel $w$, into which a bolt X, is thrust when it is desired to hold the table, arms, and dipper in any fixed position. The attendant stands in close proximity to the levers $p$, $s$, $v$, and by them gears, and ungears, changes the motion of the dipper, holds, or causes the table to turn in either direction, and manages the whole machine in all its various operations while the shaft which imparts motion to all the parts runs in one continuous direction.

$y$, $y$, $y$, $y$, represents bracing, but which does not constitute any part of the invention, and may be changed at pleasure, and need not be described. The bracket or dipper H, is made, and tripped and emptied in the usual well known manner and need not be further illustrated than is shown in the Fig. 1.

Having thus fully described the nature of my invention, what I claim therein as new and desire to secure by Letters Patent is—

1. The so arranging of the dipper with a traveling carriage as that they may be automatically moved in and out on the arms, for the purpose of insuring the filling of the bucket, when the material to be excavated is hard, as herein set forth and explained.

2. I also claim in combination with the lever $p$, the sliding piece U, clutch bar T, and pawl $r$, with their several appliances, so that by a single lever the attendant has entire control of the machine as set forth.

J. R. ANDERSON.

Witnesses:
A. B. STOUGHTON,
E. COHENY.